United States Patent [19]

Ismail

[11] Patent Number: 4,713,252

[45] Date of Patent: Dec. 15, 1987

[54] PROCESS FOR PRODUCING A SEMI-MOIST FRUIT PRODUCT AND THE PRODUCTS THEREFROM

[75] Inventor: Amr A. Ismail, Machias, Me.

[73] Assignee: Maine Wild Blueberry Co., Machias, Me.

[21] Appl. No.: 923,107

[22] Filed: Oct. 24, 1986

Related U.S. Application Data

[63] Continuation-in-part of Ser. No. 763,603, Aug. 8, 1985, abandoned.

[30] Foreign Application Priority Data

Sep. 12, 1985 [CA] Canada .................................. 490526
Dec. 4, 1985 [JP] Japan .................................. 60-271715

[51] Int. Cl.⁴ .................................................. A23B 7/14
[52] U.S. Cl. ................................ 426/290; 426/385; 426/273; 426/489; 426/639; 426/640
[58] Field of Search ............... 426/289, 290, 384, 385, 426/615, 616, 273, 295, 486, 489, 639, 640, 658

[56] References Cited

U.S. PATENT DOCUMENTS

| | | | |
|---|---|---|---|
| 2,415,995 | 2/1947 | Derby | 426/615 |
| 2,419,877 | 4/1947 | Birdseye | 426/615 |
| 2,647,059 | 7/1953 | Wenzelberger | 426/384 |
| 2,724,487 | 11/1955 | Vaile et al. | 426/489 |
| 2,785,071 | 3/1957 | Mathews | 426/639 |
| 3,356,512 | 12/1967 | Lemaire et al. | 426/615 |
| 3,406,078 | 10/1968 | Williams | 426/290 |
| 3,501,319 | 3/1970 | Ewalt | 426/385 |
| 3,800,049 | 3/1974 | Larroche | 426/639 |
| 3,806,610 | 4/1974 | Rahman | 426/385 |
| 3,833,747 | 9/1974 | Cording et al. | 426/295 |
| 3,843,810 | 10/1974 | Fehmerling | 426/486 |
| 3,930,034 | 12/1975 | Shambhag et al. | 426/639 |
| 3,931,434 | 1/1976 | Murai | 426/295 |
| 4,002,772 | 1/1977 | Haas | 426/385 |
| 4,041,184 | 8/1977 | Bonacina | 426/639 |
| 4,096,283 | 6/1978 | Rahman | 426/385 |
| 4,298,623 | 11/1981 | Anderson | 426/639 |
| 4,341,803 | 7/1982 | Koshida et al. | 426/385 |
| 4,355,050 | 10/1982 | Butland | 426/615 |
| 4,402,988 | 9/1983 | Macfie | 426/615 |
| 4,542,033 | 9/1985 | Agarwala | 416/615 |
| 4,551,348 | 11/1982 | O'Mahony et al. | 426/615 |
| 4,562,085 | 12/1985 | Ruggiero | 426/639 |

FOREIGN PATENT DOCUMENTS

3316647  8/1984  Fed. Rep. of Germany ...... 426/639

Primary Examiner—Raymond N. Jones
Assistant Examiner—Carolyn Paden
Attorney, Agent, or Firm—Samuel Meerkreebs

[57] ABSTRACT

A semi-moist fruit product produced by a sugar-syrupping processing used in conjunction with wash-rinsing, surface air-drying and freeze-drying particularly adapted for use with blueberries, cherries and other similarly constituted fruits, whereby, liquid within the fruit is removed from the fruit through osmotic pressure exchange and is replaced by sugar molecules and an equilibrium is reached, thereafter through washing, rinsing and blotting of excess syrup, the process ensures independent individual dried fruit from sticking together, followed by freezing, vacuuming drying and packaging.

24 Claims, 2 Drawing Figures

PROCESS FOR PRODUCING A SEMI-MOIST FRUIT PRODUCT AND THE PRODUCTS THEREFROM

This is a continuation-in-part of Application Ser. No. 763,603, filed Aug. 8, 1985 abandoned.

BACKGROUND OF THE INVENTION

I. Field of the Invention

This invention relates generally to food preservation and sweetening, and more particularly to the preservation of blueberries, cherries and similarly constituted fruits.

II. Description of Related Art

Listed below are the prior art patents and disclosure materials of which the applicant is aware:

"Studies of Reversible Compression of Freeze Dried RTP Cherries and Blueberries", U.S. Army Natick Laboratory Technical Report No. 70–52 F1, 1970, Rahman, A. R., Taylor, G. R., Schafer, G., Westcott, D. E.

U.S. Pat. No. 2,899,319, Issued July 30, 1959; "Dehydration of Cherries", Powers, M. J., Norman, J. D.

U.S. Pat. No. 3,356,512, Issued Dec. 5, 1967; "Method of Making Freeze Dried Artificially Sweetened Fruit Products", Lemaire, N. A., Peterson, R. D., Assignors to Kellogg Company, Battle Creek, Mich.

U.S. Pat. No. 3,395,002 Issued July 30, 1968; "Method of Freeze Drying Fruit and Combining With Dry Cereal", Vollines, W. I. Kenyon, R. E., Barnett, S., Bowden, H., Assigned to General Foods Corp., White Plains, NY.

U.S. Pat. No. 3,467,530, Issued Sept. 16, 1971; "Process of Freeze Drying of Blueberries", Scharschmidt, R. K., Kenyon, R. E.

U.S. Pat. No. 3,511,688, Issued May 12, 1970; "Artificially Sweetened Freeze Dried Food", Vollink, W. L., Scharschmidt, R. K., Kenyon, R. E., Assignors to General Foods Corporation, White Plains, NY.

U.S. Pat. No. 3,806,610, Issued Apr. 23, 1974; "Method for Making a Compressed, Freeze-Vacuum-Dehydrated Blueberry Product of Increased Density", Rahman, A. R.

U.S. Pat. No. 4,341,803, Issued July 27, 1982; "Method of Producing Dry Fruit Chip", D. Koshida, K. Sigisawa, J. Majima, R. Hattori, of Japan.

The aforementioned prior art utilizes freeze-drying to reduce the moisture content of the products, i.e., blueberries, cherries and other fruits. Certain patents apply artificial sweeteners by spraying or dipping the fruit before or after freeze-drying. They attempt to produce a low moisture content in the product that would be rehydrated before eating. The following is a discussion of the prior art listed above:

U.S. Pat. No. 2,899,319 discloses a process for the production of dehydrated cherries comprised of sulphited pitted cherries. The process involves freezing the sulphited cherries then dehydrating by vacuum and heating medium to produce a product that can be rehydrated readily in liquids before eating.

U.S. Pat. No. 3,356,512 discloses a process for rapid artificial sweetening of pieces of freeze-dried fruit product, i.e., peaches, that are readily rehydratable. In this patent, the artificial sweetener in a solvent, i.e., water, is applied to freeze-dried fruits which are then dried to a final product with moisture content not to exceed 3%. The patentees acknowledge difficulties and indicate unsuitability of using sucrose to sweeten the fruit before or after freeze-drying.

U.S. Pat. Nos. 3,395,022 and 3,467,530 disclose processes and improvements of a process to manufacture dehydrated fruit, i.e., strawberries, peaches, blueberries and bananas for use with cereal products, such as breakfast food. The fruit product has a very low moisture content, i.e., blueberries 1.5%, and is capable of rapid rehydration in milk within 30 to 180 seconds. These patents include slow/gradual freezing of the fruit to form large ice crystals in the cells to rupture cell walls to facilitate penetration of the artificial sweetener in the fruit.

Ice rupturing detrimentally affects shape and chewiness of fruit. Another destructive method used in these two patents is the cutting or puncturing by pricking of the skin and cellular structure of the blueberry fruit before freeze-drying. This destructive process to fruit skin and walls results in encouraging leaching of the anthocyanins (the blue coloring material) from the blueberries during the rehydration process into the surrounding liquid, i.e., milk or cream, this bleeding is undesirable, which causes an unappetizing color/appearance in the surrounding liquid and cereal.

U.S. Pat. No. 3,511,668 describes a procedure to artificially sweeten freeze-dried foods, i.e., strawberries, blueberries and peaches. The patentees refer to difficulties in adding sugar in solution or dry form to sweeten the fruit to desired level and freeze-drying the product. Thus, their described procedure to sweeten the fruit includes dipping or spraying solutions containing artificial sweeteners on fruit before freeze-drying to a low moisture content of 2-3% to produce a product that reconstitutes in milk or cream in 30-60 seconds. The processing procedure of slow freezing of the fruit product is used in this patent to form large ice crystals to rupture cell walls to enhance penetration of the artificial sweetener. Specifically, blueberry fruits are pricked or pierced to develop holes in the skin and cellular structure of the berry to provide the enhanced penetration.

U.S. Pat. No. 3,806,610 discloses a process for making compressed, freeze-vacuum dehydrated blueberries by sulfiting the fruit, freeze-vacuum dehydrating to a moisture of 0-5%, heating and compressing, under pressure, the dehydrated fruit.

U.S. Pat. No. 4,341,803 discloses a process for making dry fruit chips, i.e., apple, pineapple, muskmelon, apricot, persimmon and papaya for use as snack food. The process entails adjusting sugar content of the sliced fruit particles or pulp, then drying the chips by freeze-drying followed by microwave drying, then vacuum drying until their moisture content is approximately 5%. It is stressed that successive drying in three stages, by freeze-drying, microwave irradiation under vacuum and vacuum-drying are essential for the production of this product. It is also mentioned that if only the freeze-drying stage, out of the three mentioned drying stages, is employed, it is not possible to produce the desired product. The three drying processes are related in that sequence to achieve the purpose of that patent.

The present invention and product overcomes the prior art problems, mentioned above, by controlling the moisture content of the product and its sweetness without damage to the skin of the fruit or cell walls, and retaining therein the natural color and flavor of the fruit, and through minimal residual surface moisture reduces energy usage and through freeze-drying and sudden release of vacuum, collapses the treated fruit providing a product which is different in appearance, enhanced in taste, shelf life, feel and touch in one's hand and palate.

SUMMARY OF THE INVENTION

A process for producing a sweetened dried fruit product having a moisture content in the range of 10% to 40% including coating the fresh fruit with sugar, effecting osmotic fluid sugar exchange within the fruit wherein fruit juices migrate outward from the fruit and sugar migrates into fruit by osmotic exchange until the sugar concentration reaches an equilibrium across the fruit without disturbing the natural skin of the fruit and producing sugared fruit and sugared fruit syrup. Separating the syrup from the fruit, rinsing the fruit to remove surface sugar and/or syrup from the fruit, removing excess free surface moisture, and vacuum-drying or freeze-drying the fruit in a vacuum atmosphere including the rapid release of vacuum over a relatively short period to collapse the fruit to a relatively wrinkled, solid, chewy and palatable condition.

A semi-moist fruit product having a moisture content from 10%–40%, a wrinkled appearance and chewy palatable condition produced by coating the fresh fruit with sugar, effecting osmotic fluid sugar exchange within the fruit wherein fruit juices migrate outward from the fruit and sugar migrates into fruit by osmotic exchange until the sugar concentration reaches an equilibrium across the fruit without disturbing the natural skin of the fruit. Producing sugared fruit and sugared fruit syrup, separating the syrup from the fruit, rinsing the fruit to remove surface sugar and/or syrup from the fruit, and vacuum-drying the fruit in a vacuum atmosphere including the rapid release of vacuum over a relatively short period to collapse the fruit to a relatively wrinkled solid, chewy and palatable condition.

Contrary to known prior art, the important principle of this invention is a sugar-syrupping process, followed by a washing-rinsing/freeze-drying with moisture control process. Preferable advantages of the invention are as follows:

To produce a novel food product comprising semi-moist (10–40%) blueberries, cherries and the like in which the moisture and sugar content are regulated to enhance the flavor, improving the texture, palatability and shelf life of the product;

To produce a food product of the character set forth in which the preserved food can be utilized as a cooking ingredient in combination with other foods and mixtures, but which is ready-to-eat off the shelf as a snack food;

To provide an enhanced food product as set forth above, in which the process of preservation provides a food product of consistent quality, sweetness, moisture content and flavor, but which food product is also individually separated to permit measured quantities to be readily effected with minimal sticking of one food piece to another;

More specifically, to provide preserved food of the character mentioned above having an intermediate moisture content of from 10% to 40%, eatable as both a mixture element or as a snack food, being readily accommodated as an ingredient in cereals, cookies, muffins, candy, ice cream, i.e., in all instances where use of the fruit in its natural state might be contemplated, but because of the inability of natural fruit to withstand storage, travel, handling, etc., such fruit could not previously be readily used; the product having superior rehydration characteristics.

To provide a secondary by-product comprising leached sweetened fruit syrup which is freeze-dried and preserved in a crystalline state, and which has an unexpected natural flavor and color associated with the natural fruit;

To provide a preserved fruit of the character mentioned above, producing a by-product of the character mentioned, the fruit being produced in a consistent commercial manner, having markedly special superior properties over the same fruit produced by known processes, which is concentrated to afford reduced shipping weight which, by having a low moisture content and high sugar content, deters the growth of microorganisms, and thus has an extended shelf life and longer sales potential, and through its preservation, can be sold through normal marketing channels without the usual freezing, canning or special handling and merchandising; a semi-moist fruit which is a free-flowing product facilitating handling, packaging and measuring as well as accommodating it as a part of mixtures; and in which the fruit is hardy and less fragile than in its natural state and is relatively elastic or compressible, thus permitting it to be readily packaged without the inherent dangers of bruising or handling damage which results when attempting to accomplish the same with the fruit in its natural and/or canned or frozen state, to utilize a novel process to produce the food products as recited above.

These, together with other and specific advantages of the invention, will become apparent from the following description taken in conjunction with the drawing forming a part thereof, in which:

DESCRIPTION OF THE PREFERRED EMBODIMENT

The basic principle in this invention is to coat fruit with granular sugars to initiate a sugar-syrupping process followed by a washing-rinsing and freeze-drying process. The sugar-syrupping process uses a natural phenomenon, provides a non-destructive method to remove liquid from the fruit and allows for the entrance of sugar molecules into the fruit parts and cells. This non-destructive method for removal of fruit juices through cell walls, stem end-scar or fruit skin and the impregnation of the fruit parts with sugar molecules relies on the principle of osmosis and osmotic pressure to leach out fruit juice toward the sugar particles outside the fruit. As more juice exits from the fruit, the sugar particles begin to dissolve and hence the syrupping process progresses. With more juice leaving the fruit cells and fruit, more liquid accumulates in the sugar-syrupping-soaking environment resulting in more sugar dissolving into the solution. As syrupping continues, more sugar particles/molecules dissolve into the liquid causing the osmotic pressure of the syrup outside of the fruit to rise more than that inside the fruit, which causes sugar molecules to move into the fruit and into its cells and vacules. (This process is enhanced by several factors to be mentioned later.)

The process of syrupping is allowed to continue, fruit juice exits from the fruit, sugar particles dissolve into the juice forming syrup, and sugar molecules move into the fruit, until a specific equilibrium, as indicated by soluble solids contents, is reached.

An important step of this invention is to remove exterior syrup on the fruit by washing, rinsing, or blotting excess syrup from the now equilibrium/sweetened fruit before freeze-drying. Failure to adequately perform this wash separation results in a sticky, adhering product due to the drying of the syrup on the outside of the fruit, and greatly reduces the quality of the product and prevents the product from ease of flowing or measuring which is an essential characteristic in modern commercial processing, ingredient measurement, mixing and packaging systems.

Another step of this invention is the mechanical removing of excess surface water after washing or rinsing the fruit. This greatly reduces the freeze-drying time and in turn reduces production costs, since energy and time is required when excess water is present.

Another important part of this invention is the speed at which vacuum is released in the drying chamber to obtain the desired shape and appearance characteristic of the final product. This invention achieves a "collapsed" shape and texture of the semi-moist fruit. It is essential to release the vacuum in the vacuum-drying chamber very rapidly (within 1 or 2 minutes). During freeze-drying, vacuum is maintained at approximately 400 microns Hg. The rapid change in pressure around the fruit causes its walls to collapse, thus enhancing the fruits texture. If vacuum is released slowly (in 15-20 minutes), the fruit will retain a more spherical shape and will be "hollow" to the touch of hand and teeth.

Referring to the drawing, indicated at 10 is a mixer or tumbler which is filled in the conventional manner. The first step of the process concerns mixing fruit and sugar. The fruit can comprise both wild lowbush or cultivated highbrush blueberries, and/or other types of wild or cultivated, pitted cherries, and/or other types of fruit and/or pieces of fruit each of which contain various ratios of sugar when in their natural state and depending upon when they are harvested; both frozen and fresh fruit can be utilized in the process of the invention.

The ratio of the fruit, i.e., blueberries, cherries, etc., may range from 1 to 5 parts of fruit to one part of sugar with a preferred ratio of about three parts of fruit to one part of sugar. The sugar comprises various types of sugar, such as sucrose, fructose or dextrose. However, other types of sugar may be used in this process including both granular and liquid forms as is illustrated by the Examples that follow.

To attain good and uniform mixing/coating of the fruit and sugar, the fruit is placed in the tumbler 10, and the sugar is added gradually while the tumbler or coater is operating. This achieves uniform coating of the fruit.

Next, after the fruit is properly sugar-coated, the syrupping step is initiated. Indicated generally at 12 is a soaking tank, which may incorporate integral electrical heating means indicated generally at 14, or any comparable heating means, such as hot gas, steam water bath, or the like. The soaking tank is preferably mounted upon articulated supports 16, 18, which are mechanically operated in any suitable manner for raising, lowering or gently oscillating the soaking tank during the syrupping step. The supports also facilitate tilting of the soaking tank 12 to ensure good drainage from the outlet tube 20 at its downstream end.

The sugar-coated fruit from tumbler 10 is placed in soaking tank(s) 12 or trays and permitted to stand several hours, usually for up to 12 hours at conventional room temperatures of about 70°-80° F. for the syrupping process to proceed. Heat may be applied to the soaking tank(s) to accelerate the syrupping process. The soaking tanks can also be placed in hot water baths or in a tunnel with hot air circulation. Using too high a temperature, i.e., in excess of 140°, can cause too rapid evaporation of moisture, thus adversely affecting syrup yield and fruit quality. The preferred temperature range is from about 70°-80° F.

The syrupping process is further enhanced by gentle rolling or vibration of the soaking tank(s), oscillation by supports 16, 18. This movement accelerates distribution of warm temperature, and in turn, thawing of the frozen fruit, and assisting in sugar dissolving in the liquid.

The duration of the syrupping period depends on the condition of the fruit at harvest, the fruit temperature (frozen v. fresh), the holding tank temperature, and the amount of shaking/rocking of tanks. The desired or optimum osmotically-induced equilibrium is then determined by Brix scale measurements of the syrup outside the fruit and juice extracts from the fruit. The Brix scale is a hydrometer scale for sugar solutions so graduated that its readings at a specific temperature represent percentages by weight of sugar in solution. In the case of blueberries, the syrupping process ends when the Brix of the syrup outside the fruit reaches 35-40%. At this point, the soluble solids readings of juice inside the fruit, the sweetened blueberries is 22-27%.

As mentioned earlier, during the sugar-syrupping step, the natural, but generally unexploited, phenomenon of osmosis provides a non-destructive, relatively gentle method of removing liquid from the fruit without puncturing the skin. Some of the liquid is replaced by sugar molecules entering the fruit through cell walls, stem end scar or fruit skin and utilizes osmotic pressure for the exchange. Osmosis causes the fruit juice, i.e., liquids with lower solids contents (10-12% in blueberries), to leach out of the fruit, moving toward the sugar coating on the outside of the fruit. As the juice leaves the fruit, the sugar particles begin to dissolve and the syrupping commences. With more rapid juice exiting from the fruit cells, stem end-scar and parts of the enclosing skin, there results an increased accumulation of syrup in the sugar/syrupping/soaking environment resulting in more sugar going into solution. With continuation of syrupping, more sugar particles (molecules) dissolve into the emerging liquid giving rise to a pressure differential between the inside and outside of the fruit. The resulting exchange between fruit juice and sugar provides a non-destructive method of sweetening of the fruit through movement of sugar into the fruit cells and vacules. This is evident by the significant increase of more than 100% in the amount of soluble solids, largely sugar, in the juice within the sweetened fruit; as much as a threefold increase. Additionally, it was common heretofore in the prior art, to consider the blueberry skin to be impermeable to moisture exchanges. Accordingly, the prior art resorted to pricking or puncturing the skin of the blueberries before freeze-drying. However, unexpectedly in the processes of the present invention, the osmotic exchange resulted in conditioning the fruit skin to facilitate the freeze-drying step without puncturing the fruit skin.

After reaching the desired equilibrium, the soaking tank 12 is then tilted toward its downstream end toward the exit tube 20. The contents of the tank 12 are discharged into a combination sieve/conveyor 22 at which time a major portion of the sugared fruit syrup descends into compartment 24 and exits at discharge tube 26 to be collected in suitable containers or vats and subsequently treated as will be described. Suffice it to say that the sugared fruit syrup generated or produced is richly enhanced by the natural products color, flavor and aroma through its natural generation by osmotic exchange. This runoff is rich in color and flavor, is suitable as a basic ingredient in the manufacture of jelly, jams and pancake syrups. The yield of syrup is approximately 50–60% and sweetened fruit about 40–50% relative to the initial mixture of fruit and sugar.

It is to be noted that the sugar is the vehicle that initiates and continues the osmotic action. Most of the sugar is salvaged in the syrup or runoff after the fruit is sweetened. Thus, the addition of more sugar to produce jelly, drinks, etc., is substantially eliminated, and the sugar of this process has a multiple unexpected function of being a vehicle, and a basic ingredient of a usable mixture of natural fruit juice with characteristic color, flavor and aroma, and sugar, which will be subsequently concentrated and crystalized, as will be described.

The sieve/conveyor 22 includes a second downstream compartment 27 having a gravity outlet 28. The sieve/conveyor passes beneath suitable water jet means 29 from which cold, clean rinse water is discharged. The amount of rinse water is sufficient to insure that substantially all excess adhering syrup is removed from the exterior of the individual fruit or pieces. The cold water is at a temperature of about 40°–70°, preferably 40°–45° F., and the conveyor sieve can be appropriately oscillated to slightly jostle the fruit thereon to insure good contact with the rinse water. The temperature of the rinse water is preferably maintained at 40°–45° F. so that in addition to rinsing off excess syrup and sugar particles, it provides a secondary function of pre-cooling the fruit in preparation for the freeze-drying process.

Figure 2:
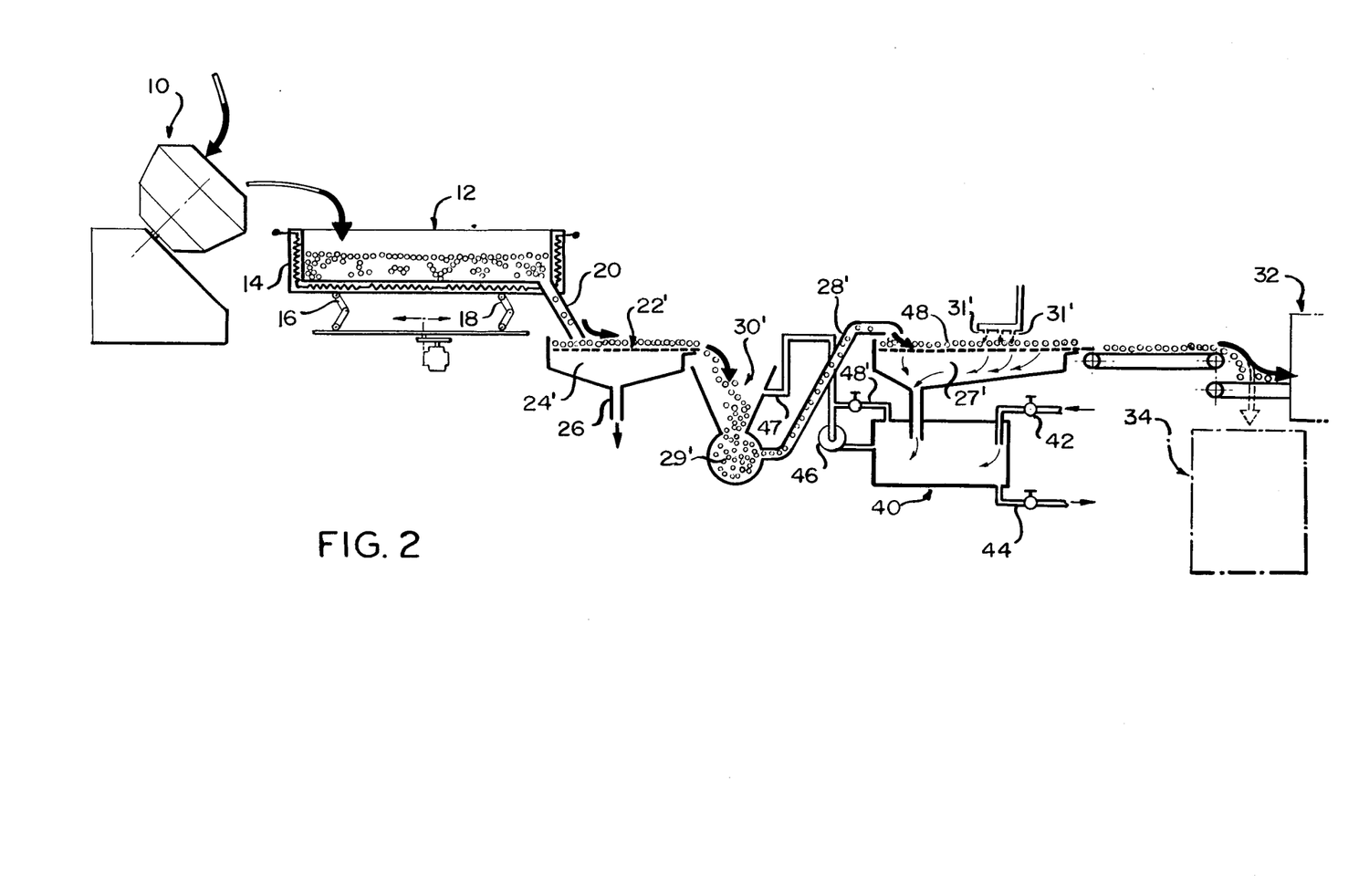
FIG. 2 is a schematic illustration of another system for accomplishing the process of the invention.

Alternatively, as will be later described relative to FIG. 2, the sweetened fruit may be completely immersed in rinse water by dipping; the conveyor/sieve may have a run (not shown) descending into a suitable clean running bath of rinse water at approximately 40°–45° F. for a relatively short period of time, i.e., from about 10–20 seconds being the immersion period.

Figure 1:
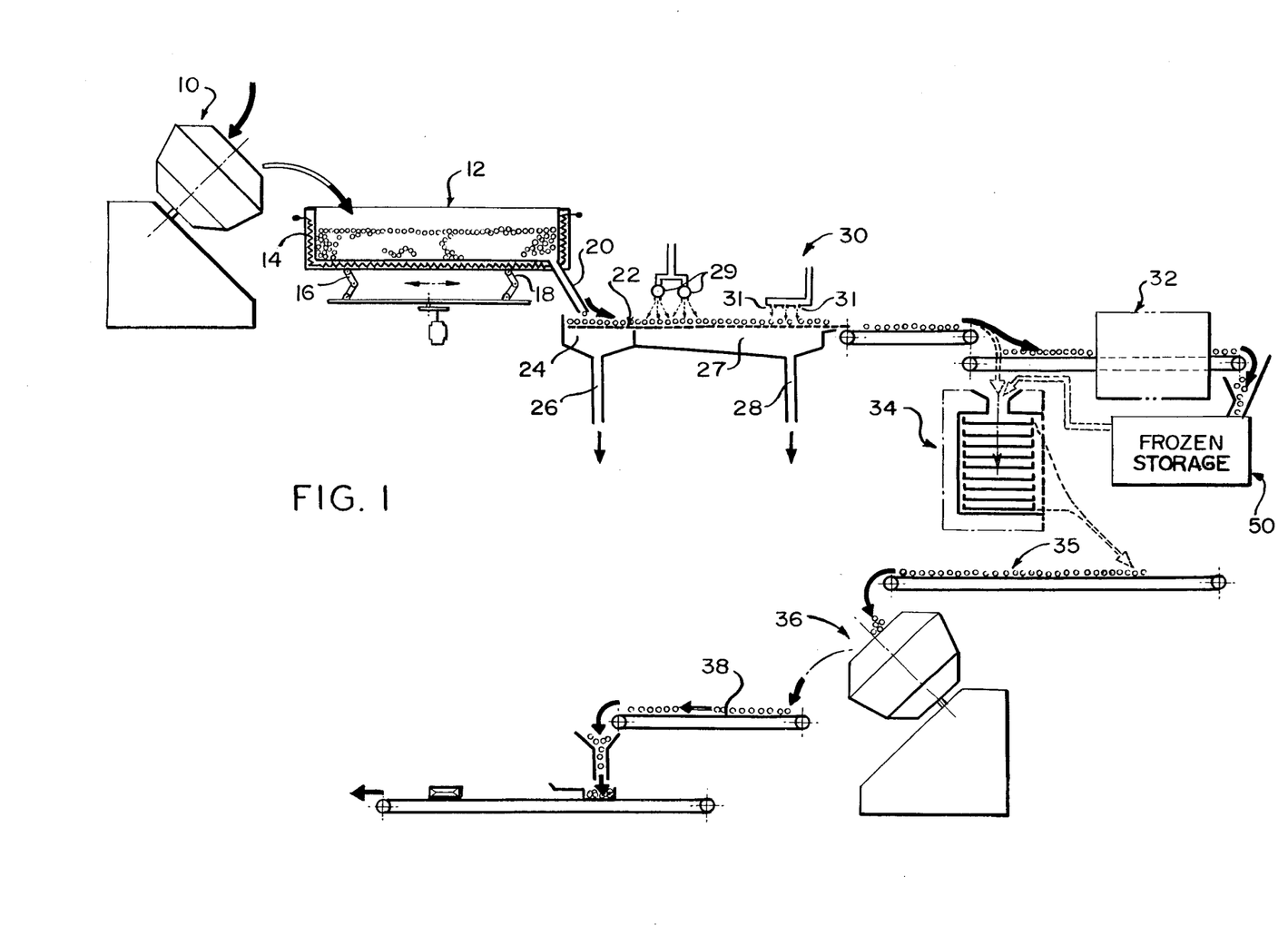
FIG. 1 is a schematic illustration of a system for effecting the process of the invention.

Still further downstream in FIG. 1 and overlying the downstream end of the conveyor/sieve is a water removal means 30 comprising a plurality of conventional air jets or "air knives" 31; the sieve/conveyor is preferably vibrated or shaken where the fruit passes beneath the jets 31 thus affording partial drying of the surface of the fruit, and providing a secondary runoff product at 28, which is directed to suitable containers or vats for subsequent treatment. The secondary runoff, which is more dilute than the syrup per se collected at 26, sugarwise, and depending upon the percentage of soluble solids, provides an ingredient for the production of wine, for example. Clearly, the process involved utilizes substantially all of the fruit being preserved, the salvaged fruit juices and the treatment sugar.

The removal of syrup and excess rinse water during the sieve/conveyor step(s) reduces the freeze-drying time of the fruit. This results by the reduction of moisture content in the fruit, i.e., sweetened blueberries after the syrupping process contained approximately 70% moisture; this fruit after rinsing and surface air drying contains approximately 64–65% moisture. This is particularly important in large scale, commercial installations, and appreciably reduces the expenditure of energy and freeze-drying costs, and improves the condition of the preserved product by eliminating sticking of the final semi-moist product.

The next step comprises freezing of the fruit where the fruit is either IQF (individual quick freezing) or vacuum frozen.

From the conveyor/sieve 22, the sweetened, de-syrupped, rinsed and de-watered product may be transfered to an IQF (individual quick freeze) tunnel 32 where it is frozen and then placed in cold storage at 50 in a low temperature preferably −10° F., until the later, freeze-drying process. This is an important feature for scheduling large commercial production runs, especially when using fresh fruit in the mixing/sugar/syrupping process, since the period of availability of fresh fruit is usually short, i.e., for blueberries about 6–8 weeks.

Sweetened, rinsed, and surface dried fruit which has been stored at 50, or immediately after rinsing and surface drying, is then freeze-dried in chamber 34, incorporating the usual seals and controls, where the fruit is freeze-dried to the desired moisture content level. For example, the sweetened fruit was freeze-dried by placing it in ribbed trays 26" long×13" wide×2" deep and placed in a freeze-drying chamber with a condenser setting of −30° to −35° F., oil temperature of 220° F. and platen temperature of 180° F. to 220° F., vacuum of 400 microns Hg, and freeze-dried until the product temperature reached 75°–100° F. The duration of the freeze-drying cycle varied according to temperature settings and moisture level desired (10 to 40%). Final product temperature in the freeze-drying chamber of 70° F., 80°–90° F., and 95°–100° F. coincides with product moisture content of 35–38%, 20–25%, and 12–18%, respectively.

It should be here noted that to obtain the desired wrinkled/collapsed appearance, and elasticity/chewiness of the product, vacuum in the vacuum-drying chamber 34 (approximately 400 microns Hg) was released rapidly (within 1 to 2 minutes). Rapid release of the vacuum resulted in collapse of the fruit to give the desired form, appearance and touch to the hand and teeth. When the vacuum is released, the chamber is filled with either air or nitrogen.

The fruit (blueberries or cherries), was then scraped off the freeze-drying trays of chamber 34 onto conveyor 35 which directs the product to mixer 36 where it is treated with an anti-caking agent. Several anti-caking agents were used (i.e., Durkex 500 TM, calcium stearate, Cantab TM). From mixer 36, the coated product is discharged onto conveyor 38 for subsequent packing.

In summary, the invention entails the manufacture of sweetened semi-moist fruit products. In this invention, liquids from fruits are leached out and sugar molecules are impregnated or transferred into the fruit parts and cells by an osmotic syrupping process. In syrupping, fresh or frozen fruit (blueberries of the lowbush and highbush types and cherries), were mixed with sugar at different ratios. The fruit-sugar mixture was let stand and syrupping, where fruit juice defuses out of the fruit and sugar molecules dissolve in the emerging liquid and then migrate into the fruit. The syrupping process was accelerated by regulating temperature and adding mixing-movement to the fruit/sugar/syrup mixture. At a specific end point, the syrup and sweetened fruit were separated. For example, when the Brix scale of the syrup reached 35–40% and soluble solids in juice of sweetened blueberries reached 22–27%, the sweetened blueberries and syrup were separated. Excess adhering syrup was removed from the sweetened fruit by washing or rinsing with cold water. Free water on the surface of the sweetened fruit was then removed by subjecting the fruit to shaking/vibrating movements and to jet air blasts. The fruit was then frozen and held and then vacuum-dried or freeze-dried to moisture levels of (10–40%) subject to end-use. The fruit was then coated with anti-caking material (such as Durkex 500 TM, calcium stearate, Cantab TM, or others), and packed in various size and type containers.

Referring to the syrup runoff received at outlet 26 of the sieve/conveyor compartment 24, as was previously mentioned, the sugar constituted as syrup, had a multiple function, i.e., to initiate and maintain osmotic exchange or differential pressure on the fruit resulting in the fruit being sweetened and made uniform in consistency and taste, while the sugar/syrup takes on an unusually characteristic color and flavor of the fruit. Referring to FIG. 2, an alternate system for preserving the fruit is illustrated, similarly functioning units will be identified with reference numerals used in FIG. 1. The basic steps, i.e., sugar coating the fruit in tumbler 10 and soaking the sugared fruit at a controlled heat in tank 12, are accomplished as was previously described.

Next, the soaked fruit with a sugar level in osmotic equilibrium is discharged onto sieve/conveyor 22' and the syrup decends into compartment 24' and out of the outlet tube 26' to be recovered in suitable containers or vats for the uses previously described.

The fruit is discharged into a cold water rinsing vat 30' to a pump manifold 29' from which the rinsed fruit is directed through conduit 28' onto a second sieve/conveyor 48, preferably of the vibrating type. The fruit, which is rinsed, then passes beneath water removal means 31' comprising air jets or knives, as in the previous embodiment, which functions to remove the surface water from the rinsed fruit. The second sieve/conveyor 40 has an underlying compartment 27' into which the water and/or rinse solution drain as they did in the earlier described embodiment.

The materials washed off the fruit, as it is being dried, are directed to a make-up water system, including a tank 40 communicating with a water inlet 42 (for make up) and a drain 44. The tank is operatively connected to a pump 46 for directing circulating water through 47 to the rinsing vat 30' or bypassed back to the tank 40 through by-pass pipe 48.

Fruit is then IQF (individually quick frozen) or vacuum frozen before freeze-drying as was described with respect to the system of FIG. 1.

In the past, various methods have been used to concentrate fruit juice to powder for subsequent use in bakery products, beverages, jellies, puddings, and other deserts. Drum drying has been used in dehydration of powdered cranberries, tomato juice, pea and bean soup, apple flakes, fig powder, etc. However, products suffer certain amounts of heat damage due to the contact with a relatively hot surface throughout the drying cycle. Since these fruit powders are sensitive to heat damage, drying temperature and time of exposure are critical factors; minimum heat and/or less time must be used.

Spray drying has been used in dehydration of milk, eggs, coffee, citrus juices, corn syrup solids and tomato juice, but the products may tend to become hydroscopic and low in melting point resulting in sticking or caking problems to the interior of the spray drying system or caking in the package.

Several spray drying aids such as sucrose, corn syrup solids, lactose, gums, alginate, pectic substances, milk solids, starch, sodium carboxymethyl cellulose, methyl cellulose and glyceryl monostearate have been used to facilitate production of a free flowing powder. However, since some aids must be added at a large fraction, the final product is a formulation with only a certain proportion of fruit juice solids, and is affected by these additives. For a juice, like blueberry juice, with relatively mild or subtle flavor, spray drying with or without drying aids has not attained free-flowing powder-production.

Listed below are the prior art disclosures of which the applicant is aware:

Selzer, E. and Settlemeyer, J. T., "Spray Drying of Foods", *Adv. Food Res.*, No. 2:399–520.

Anon, "New Orange Juice Powder", *Food Eng'g*, No. 25(1):186, 1953.

Burton, L. V., "Hi-Vacuum Technics for Drying Orange Juice", *Food Indust*, No. 19(5):617–622, 738, 740, 742, 744, 1947.

Eddy, C. W., "Process of Drying Fruit or Vegetable Materials Containing added Methylcellulose", U.S. Pat. No. 2,496,278, Feb. 7, 1950.

Flosdorf, E. W., "Process of Desicating Fruit Juices", U.S. Pat. No. 2,509,681, 1950.

Schwarz, H. W., "Dehydration of Heat Sensitive Materials", *Ind. Eng. Chem*, No. 40:2028–2033, 1948.

Sluder, J. C., Olson, R. W., and Kenyon, E. M., "Production of Dry Powdered Orange Juice", *Food Technol*, No. 1:85–94, 1947.

Tammern, P. T., "Vacuum Evaporation of Fruit Juices", Dutch Pat. No. 64,132, 1949.

As mentioned above, prior art has not served to produce a free flowing product in powder from and yet attain the subtle flavor of a fruit such as blueberries, particularly due to the necessity for additives to prevent caking and/or aglommeration in the spray drying apparatus.

With reference to FIG. 1, the syrup runoff is attained at outlet pipe 26; this concentrated syrup constitutes from approximately 50–60% of the mixture of fruit and sugar. It is then diluted with different ratios of water and freeze-dried until the moisture content reaches from 1–2%. After freeze-drying, the resulting crystallines are removed from the drying trays into which they had been deposited and are packaged in cans, jars, or plastic pouches either preferably in a nitrogen atmosphere.

EXAMPLE 1

Individually quick frozen wild (lowbush) blueberries were mixed with granular sugar (sucrose) and/or syrups containing high sugar (fructose) content at different ratios, by weight, of fruit to sugar. Twenty pounds of blueberries were used with the granulated sugar ratios and ten pounds of blueberries with the sugar syrup mixture. The following table (Table I-A) illustrates the kinds of sugar, and fruit to sugar ratios used.

TABLE I-A

| Blueberry and Sugar Mixing Ratios TREATMENT: Fruit and Sugar | | | |
|---|---|---|---|
| No. | Blueberry (lb.) | Sugar (lb.) | Type Sugar |
| 1 | 20 | 20 | 1:1 sucrose, granular |

TABLE I-A-continued

Blueberry and Sugar Mixing Ratios
TREATMENT: Fruit and Sugar

| No. | Blueberry (lb.) | Sugar (lb.) | Type Sugar |
|---|---|---|---|
| 2 | 20 | 10 | 2:1 sucrose, granular |
| 3 | 20 | 6.7 | 3:1 sucrose, granular |
| 4 | 10 | 10 | 1:1 high fructose corn syrup, Brix = 82° |
| 5 | 10 | 10 | 1:1 corn syrup, Brix = 75° |

The temperature of the frozen blueberry fruit was −10° F., and the soluble solids in the fruit juice was 12%. The fruit and sugar or syrup were mixed thoroughly, placed in separate plastic tubs and allowed to stand at a temperature in the range of 50°-60° F.

The effect of mixing blueberries and sugar at different ratios is presented in Tables I-B and I-C.

TABLE I-B

Effect of mixing blueberries and sugar at different ratios on sugar content in blueberries and syrup.

| Treatment No. | Soaking duration (hr.) | Product temp. | Blueberry Soluble Solids (%) [Not Rinsed] | [Rinsed] | Syrup Brix % |
|---|---|---|---|---|---|
| 1 | 21 | 36° F. | — | — | sugar, largely undissolved |
| 2 | 21 | 34° F. | — | — | sugar, largely undissolved |
| 3 | 21 | 38° F. | 21 | 18 | 45 |
| 4 | 21 | 50° F. | 22 | 21.2 | 43 |
| 5 | 21 | 46° F. | 24 | 21 | 38 |
| 1 | 28 | 58° F. | 35.6 | 22 | 64, some undissolved sugar |
| 2 | 28 | 56° F. | 33 | 27 | 48 |
| 3 | 28 | 42° F. | 24 | 20.2 | 41 |
| 4 | 28 | 60° F. | 31 | 27 | 43.6 |
| 5 | 28 | 58° F. | 24 | 24 | 40 |
| 1 | 45 | 59° F. | 47 | 27.6 | 62, some undissolved sugar |
| 2 | 45 | 59° F. | 36.4 | 27.2 | 45 |
| 3 | 45 | 60° F. | 25 | 23.6 | 34 |
| 4 | 45 | 60° F. | 35 | 30 | 41.4 |
| 5 | 45 | 60° F. | 32 | 31.8 | 40.4 |

When frozen blueberries were mixed with granular sugar at the ratio of 1:1 by weight and allowed to stand at temperature of approximately 50°-60° F. for 45 hours, a considerable amount of sugar added (approximately 25%) did not go into solution and remained in a crystalline form.

At all tested mixture ratios from 1:1, 2:1 and 3:1, by weight, fruit to granular sugar, and 1:1 of fruit to similar weight of high fructose corn syrup (Brix=82°) and corn syrup (Brix=75°) and allowed to stand at 60° F., a syrupping process took place where juices moved out of the fruit and sugar molecules moved in and impregnated the fruit.

Sweetened fruit from all treatments had a very pleasant sweet flavor, in addition to their distinct blueberry flavor. All syrup produced had the distinct color and flavor of blueberries.

TABLE I

Final yield of sweetened blueberries and syrup 45 hours after mixing blueberry and sugar

| Treatment No. | Blueberry Yield (%) | Syrup Yield (%) |
|---|---|---|
| 1 | 24.4 | 75.5 (contained undissolved sugar) |
| 2 | 33 | 67 |
| 3 | 43.5 | 56.4 |
| 4 | 31.5 | 68.5 |
| 5 | 31.4 | 68.6 |

EXAMPLE II

Thirty pounds of individually quick frozen cultivated (highbush) blueberries were mixed with ten pounds of sugar and placed in a plastic tub. The plastic tub was then placed in a water bath where water temperature was maintained at 130° F. for eight hours. The plastic tub containing the blueberry-sugar mixture was oscilated and the contents jostled once, every 30-60 minutes, to further mix the blueberries, sugar, and emerging syrup.

The soluble solids in the juice of the blueberries was 10% and the temperature of the fruit when mixed with sugar was 10° F.

Eight hours after mixing, soaking in a water bath at 130° F., and occasional rolling and shaking of the contents, the syrupping process was terminated and the berries were separated from the syrup. Seventeen pounds of sweetened blueberry fruit were recovered (42.5% of total mixture) and the weight of the syrup was 22.6 pounds (56.6 of total mixture). Soluble solids in the juice of the sweetened berries were 20% and the Brix of the syrup was found to be 44°.

The fruit had a sweet and pleasant mild blueberry flavor, and the syrup possessed a purple color which was much lighter in density and had a milder blueberry flavor when compared to syrup obtained from Example I; primarily because cultivated blueberries initially, before treatment, have this characteristic.

EXAMPLE III

Individually quick frozen wild blueberries (lowbush) were mixed with sugar at different ratios by weight varying between one and five fruit to one sugar. The temperature of the frozen blueberries was −2° F. and the soluble solids in the blueberry juice was 12%. The fruit and sugar were mixed well, then placed in plastic containers and allowed to stand at room temperature (approximately 70°-80° F.) for fourteen hours. The syrupping process earlier described in the previous examples took place in all the fruit to sugar ratios here tested and the results of solids contents in fruit and syrup are listed in the following table:

| Mixture Ratio | Ingredients weight (gm) Blueberries | Sugar | Blueberry Soluble Solids (%) | Syrup Brix° |
|---|---|---|---|---|
| 1:1 | 1000 | 1000 | 31 | 49 |
| 2:1 | 1000 | 500 | 28 | 45 |
| 3:1 | 1000 | 333 | 23 | 38 |
| 4:1 | 1000 | 250 | 21 | 33 |
| 5:1 | 1000 | 200 | 20 | 29 |

Differences were noted in flavor of the sweetened blueberries, with fruit from the 3:1 fruit to sugar ratio by weight most preferred. They had a delightful balance between sweetness and the delicate, but distinct flavor of wild blueberries.

EXAMPLE IV

Three hundred pounds of individually quick frozen blueberries were mixed with one hundred pounds of sugar in a commercial Gemco tumbler/blender for five minutes. The sugar coated blueberries were then placed in aluminum trays with these approximate dimensions: 30" long×18" wide×6" high. The sugar coated blueberries were placed in the trays to a height of only four inches. The trays were allowed to stand at room temperature of approximately 70° F. for approximately fourteen hours. During this period the syrupping process took place.

The blueberries and syrup were then separated by placing the berries/syrup mixture on a sieve with openings of ⅛". The syrup collected weighed 176 pounds and had a Brix reading of 38°.

The sweetened blueberries were then placed in perforated plastic trays and dipped/immersed into a large water tank filled with cold water (temperature approximately 60° F.) for a period of 20–30 seconds. They were then placed on a vibrating perforated conveyor belt, rinsed further with a stream of cold water, followed by a stream of air. This served to remove a large portion of the syrup and water from the surface of the fruit.

The weight of the sweetened blueberries was 174 pounds and the soluble solids in their juice was 24%. The moisture content of the sweetened berries before rinsing and surface air drying was 70% and 64% after water rinsing and surface drying.

The blueberries were then placed in ribbed trays 26" long×13" wide×2": deep with approximately 12.4 pounds fruit per tray. The trays were placed in a freeze-drying chamber where the berries were freeze-dried under vacuum of 400 microns Hg, oil temperature of 220° F., platen temperature of 180° F. to 220° F., and a condenser temperature of −30° to −35° F. After eight hours, the product temperature reached 90° F. At this point, the vacuum was released rapidly (in 90 seconds). Moisture content of the blueberries was 22%. The berries were immediately removed from the freeze-drying trays, separated, and allowed to cool.

This novel process produced a collapsed blueberry product with very attractive appearance, intact but slightly wrinkled, and distinct tart but sweetened blueberry flavor. The fruit was chewy, had pleasant feel to the teeth and palate, and was not sticky to the touch of the fingers or to each other.

EXAMPLE V

One hundred pounds of pitted frozen cherries were mixed with thirty-three pounds of sugar, allowed to stand to syrup, drained, rinsed, surface dried, and freeze-dried as described in Example IV for approximately ten hours. Sixty-one pounds of cherry syrup with a Brix of 42° were collected. The weight of the sweetened cherries before drying was 51.7 pounds. The soluble solids of these sweetened cherries before rinsing was 36.5%, and 34% after rinsing with cold water. The moisture content of these cherries was 74.6% before rinsing. Twenty pounds of semi-moist cherry product, with a moisture content of 17.6%, were obtained.

The cherries had excellent flavor and were chewy with a pleasant feel to the teeth and palate, having a collapsed wrinkled appearance.

EXAMPLE VI

Semi-moist blueberries (20% moisture content) were produced by the procedure described in Example IV. Commercially available oil, Durlex 500 TM was then used at the rate of 0.25, 0.5, 1.0, 2.0 or 5.0% by weight to coat five pound lots of the blueberries. The oil, at 70° F., was placed in a stainless steel pail. The pail was rotated to allow the oil to coat the inside walls and bottom of the container. Five pounds of the processed blueberries were then placed into the pail and shaken, rolled and mixed repeatedly in the container until uniformly coated with the oil.

The oil coating enhanced the flowing and appearance characteristics of the blueberries. When applied at 0.25 to 1.01 (oil to fruit by weight) it had no noticeable residue on the surface of the fruit. None of the tested ratio 0.25 to 5.0% by weight had an apparent effect on the flavor of the product.

EXAMPLE VII

Frozen blueberries were mixed with sugar at a ratio of 3 blueberries to 1 sugar by weight as described in Example III. After reaching equilibrium, the sweetened fruit was separated from the syrup, placed in a wash tank (K-10 washer by Key Technology of Milton Freewater of Oregon) where it was washed with cold water (40°–50° F.), the berries were then placed on a vibrating shaker/mover (ISO-FLO de-watering shaker by Key Technology) where they were further sprayed with fresh water (40°–50° F.) to further remove adhering syrup, then passed beneath air jets for surface water removal from the rinsed fruit. The sweetened, washed, rinsed air dried fruit was then individually quick frozen (IQF) into a freezing tunnel (Frigoscandia® Flow-Freeze freezing tunnel of Frigoscandia Contracting Inc., Bellevue, Wash.) where they were frozen to −15° F. The frozen fruit were then held in regular commercial cold storage at −10° F.

Twenty-eight pounds of the frozen sweetened fruit having a soluble solids readings of 29° Brix in the juice was then vacuum dried in a vacuum tumbler dryer (Paul O. Abbe Rota Cone Vacuum Dryer of Paul O. Abbe, Inc., Little Falls, N.J.). Temperature of the blueberries was 0° F., and the temperature of the oil circulating between the dryers' jacketed walls were set at 150° F., and the drying cone rotated at 5 RPM (rounds per minute). Vacuum was measured at 30 in. Hg (mercury). The following table illustrates the vacuum tumbling drying conditions:

| Time elapsed | Blueberry temperature | Oil/Drum temperature | RPM | Vacuum | Oil Pressure |
| --- | --- | --- | --- | --- | --- |
| Start | 0° F. | 150° F. | 5 | 0 in · Hg | 0 psi |
| 30 minutes* | 60° F. | 200° F. | 5 | 30 | 30 |
| 180 minutes | 88° F. | 200° F. | 5 | 30 | 30 |
| 240 minutes | 88° F. | 200° F. | 5 | 30 | 30 |

*Drained/removed free juice = 8.28 lbs., Brix = 28°, temperature = 60° F.

After 240 minutes of vacuum-drying at 30 in. Hg vacuum, the vacuum was released suddenly (in less than 2 minutes) and the semi-moist blueberries were then removed from the dryer and allowed to cool to room temperature. The blueberries were chewy, had a good flavor, collapsed appearance, were free flowing and shelf stable. The amount of semi-moist blueberries were 7.87 pounds, representing a yield of 28.1% from the initial amount of frozen, sweetened blueberries. Moisture content was 18%.

EXAMPLE VIII

Frozen blueberries were sweetened with fructose corn syrup (HFCS) at a ratio of 2 blueberries to 1 HCFS by weight as described in Example I. When the soluble solids of the sweetened blueberries reached 27° Brix, they were then separated from the syrup and rinsed as described in Example VII. The sweetened, rinsed blueberries were chilled to a temperature of 26° F., then vacuum dried as described in Example VII. The following conditions were attained:

| Time elapsed | Blueberry temperature | Oil/Drum temperature | RPM | Vacuum | Oil Pressure |
|---|---|---|---|---|---|
| Start | 26° F. | 200° F. | 5 | 30 in Hg | 30 psi |
| 20 minutes* | — | 200° F. | 5 | 30 | 30 |
| | | decreased to 150° F. | 5 | 30 | 30 |
| 140 minutes | 70° F. | 150° F. | 5 | 30 | 30 |

*Removed free juice = 0.71 lb., Brix = 40°, temperature = 86° F.

After 140 minutes of vacuum-drying under the aforementioned conditions, the amount of semi-moist blueberries recovered was 6.86 pounds or 37.1% of the sweetened blueberries used, and had a moisture content of 24%. The dehydrated blueberries had excellent blueberry flavor, but were slightly sticky to the touch.

While the invention has been described by reference to specific examples and embodiments, it is limited only by the scope of the appended claims.

I claim:

1. A process for producing a sweetened, semi-moist fruit product having a moisture content in the range of 10% to 40% comprising:
   (a) coating fresh or frozen fruit with an effective amount of sugar to initiate nondestructive osmotic fluid-sugar exchange;
   (b) continuing the nondestructive osmotic fluid-sugar exchange within the fruit in which fruit juices migrate outward from the fruit and sugar migrates into the fruit by the osmotic exchange until the sugar concentration reaches an equilibrum across the fruit, without disturbing the natural skin of the fruit to produce a mixture of sugared fruit and sugared fruit syrup,
   (c) separating the syrup from the fruit;
   (d) rinsing the fruit to remove surface sugar and syrup from outside the fruit; and
   (e) drying the sweetened fruit in a vacuum atmosphere of up to 400 microns Hg and suddenly releasing the vacuum atmosphere within 1 to 2 minutes to collapse the fruit to a relatively wrinkled solid, chewy and palatable condition.

2. The process as set forth in claim 1 in which the osmotic sugar exchange is continued until the Brix of the syrup outside the fruit is from 35% to 40% and the soluble solids reading of the juice within the said sweetened fruit is from 22% to 27%.

3. The process is set forth in claim 1 in which said rinsing of the fruit according to step (d) is water at a temperature ranging from 40° F. to 70° F. to condition the fruit for subsequent freeze-drying.

4. The process as set forth in claim 3 in which the sugared fruit is only rinsed sufficiently to remove surface syrup and sugar from the fruit without causing dilution of the sugar in the fruit.

5. The process as set forth in claim 4 in which excess free surface liquid is removed from the fruit.

6. The process as set forth in claim 5 in which said free surface liquid is removed by an air stream.

7. The process as set forth in claim 4 after rinsing the fruit according to step (d) including drying the sugared fruit so that it contains up to 65% moisture, by weight, to minimize freeze-drying time according to step (e).

8. The process as set forth in claim 1 in which the ratio of fruit to sugar, by weight, is 3 to 1.

9. The process as set forth in claim 1 in which the fruit comprises wild (lowbush) blueberries.

10. The process as set forth in claim 1 in which said fruit comprises cultivated (highbush) blueberries.

11. The process as claimed in claim 1 in which said fruit comprises cherries.

12. The process as set forth in claim 1 in which sugared fruit and sugared fruit syrup is from 50 to 60% and 40 to 50%, by weight respectively, of the mixture when the Brix of the syrup outside the fruit is 35 to 40% and the soluble solids readings of the juice within the fruit is from 22 to 27%.

13. The process as claimed in claim 1 in which said sugared fruit, after being rinsed according to step (d) is individually quick frozen so that the frozen fruit is free flowing.

14. The process as claimed in claim 1 in which said sugared fruit is vacuum frozen.

15. The process as claimed in claim 1 in which the drying of the sweetened fruit is effected in a freeze-drying vacuum atmosphere.

16. The process as claimed in claim 1 in which the dried fruit is coated with an anti-caking agent.

17. The process as claimed in claim 1 in which the sugared fruit of step (d) is rinsed by dipping the fruit in a water bath at a temperature of up to 70° F. and for a period of from 10-20 seconds.

18. The process as claimed in claim 1 in which said sugared fruit syrup of step (c) is diluted with water and is freeze-dried until the moisture level reaches from 1-2% and the dried sugared fruit syrup has a crystalline form.

19. The process as set forth in claim 1 in which said osmotic fluid sugar exchange is effected at room temperature of about 70°-80° F.

20. The process as set forth in claim 1 in which said fruit, while subject to osmotic sugar exchange of step (b) is subjected to gentle mixing and an elevated temperature not in excess of 140° F.

21. The product as produced by the method of claim 1.

22. The product as produced by the method of claim 9 and wherein said fruit comprises wild(lowbush) blueberries.

23. The product as produced by the method of claim 10 and wherein said fruit comprises cultivated(highbush) blueberries.

24. The product as produced by the method of claim 11 and wherein said fruit comprises cherries.

* * * * *